Dec. 22, 1931.  C. F. WATTS  1,837,509
TELEGRAVURE METHOD AND APPARATUS
Filed Sept. 14, 1929   8 Sheets-Sheet 1

Fig.1.

Inventor
Cecil F. Watts
By Mason Fenwick & Lawrence
Attorneys

Dec. 22, 1931.  C. F. WATTS  1,837,509
TELEGRAVURE METHOD AND APPARATUS
Filed Sept. 14, 1929     8 Sheets-Sheet 7

Inventor
Cecil F. Watts
By Mason Fenwick & Lawrence
Attorneys

Dec. 22, 1931.  C. F. WATTS  1,837,509
TELEGRAVURE METHOD AND APPARATUS
Filed Sept. 14, 1929   8 Sheets-Sheet 8

Inventor
*Cecil F. Watts*
By *Mason Fenwick & Lawrence*
Attorneys

Patented Dec. 22, 1931

1,837,509

UNITED STATES PATENT OFFICE

CECIL FRANCIS WATTS, OF MIAMI, FLORIDA

TELEGRAVURE METHOD AND APPARATUS

Application filed September 14, 1929. Serial No. 392,585.

This invention relates to apparatus and method involving the telegraphic transmission of pictures, photographs, drawings, signatures, etc., and to the art of facsimile telegraphy in general.

The main object of the invention is to provide very simple and improved transmitters and receivers which can be very cheaply manufactured and easily operated, and by which the transmitted original may be reproduced directly in such form as to adapt the reproduction for immediate use in the printing of the reproduced matter in newspapers, especially, where a screened half tone is necessary to bring out the various shadings of the original.

Another object of the invention is to provide cooperating transmitters and receivers for this class of work in which the parts are so constructed as to insure absolute synchronism in the movements of the corresponding parts of the two instruments.

Other objects of the invention will become apparent as the detailed description thereof proceeds.

In the drawings:

Figure 6 is a fragmentary detail illustrating carriage release mechanism, with the parts in a different position from that shown in Figure 4;

The transmitter and receiver of this system are preferably mounted on framework similar to that of a typewriter of standard construction; and each of these instruments includes as part of its operating mechanism a spring controlled carriage movable, as is common in typewriter construction by means of a cable connected at one end to the carriage, and at its other end to the spring. The intermittent carriage release is the same as that of the ordinary typewriter; but the carriage is returned automatically by a motor at the end of its movement in one direction on the framework.

In this system the transmission and reproduction is effected from a flat plate of conducting material upon which the picture or writing to be reproduced is formed as a screened image, preferably photographically, and this image is electrically transmitted, either as a positive or negative to a similar plate on the distant receiver.

Referring now particularly to Figures 2, 4, 5, and 6, for details of construction, to both transmitter and receiver, the reference character 1 designates the framework of the receiver somewhat similar in shape to the framework of a typewriter of standard construction. A carriage 2 has the base 3 (see Figure 4) mounted slidably by ball bearings between the V-shaped grooves 4 and 5 in the guide members 6 and 7 of the framework 1.

A coil spring 8 mounted in a drum 9, of the usual typewriter construction, is suitably mounted on the rear wall 10 of the frame 1. A cable 11 has one end fixed to the periphery of the drum and has its other end fixed to a bracket 12 extending from the bottom of the base 3 of carriage 2. This construction is common in practically all typewriters for feeding the carriage thereof in one direction.

In this invention the intermittent movement of the carriage in the direction of spring tension is controlled by the usual escape mechanism of typewriter construction. However, the intermittent spacing of the typewriter would be much too large for the purpose of this invention, and I have, therefore, added gearing to the typewriter escape mechanism to reduce the movement of the carriage at each operation of said mechanism, which is ordinarily controlled by the operation of the typewriter spacing bar.

Figure 4:
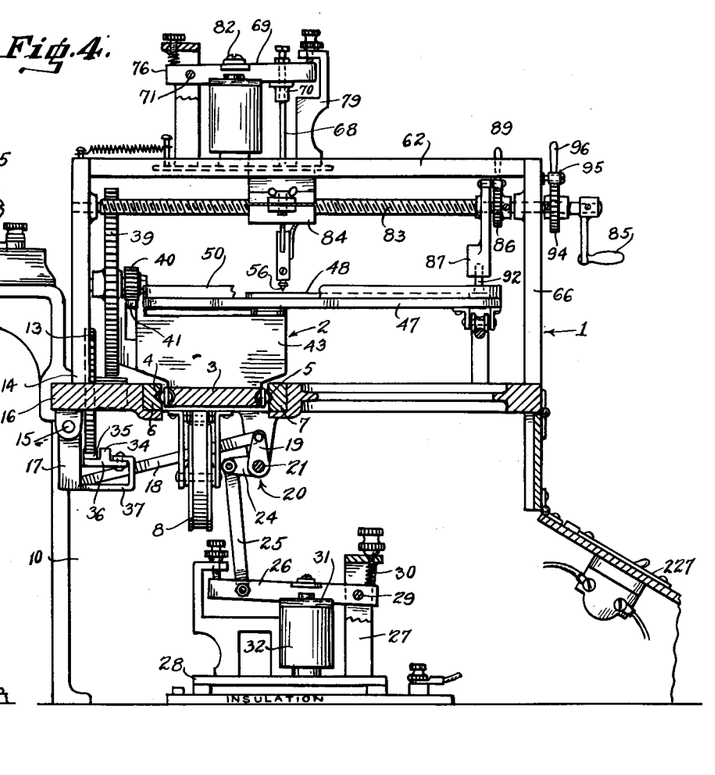
Figure 4 is a vertical transverse section of the receiver mechanism.
Figure 5:
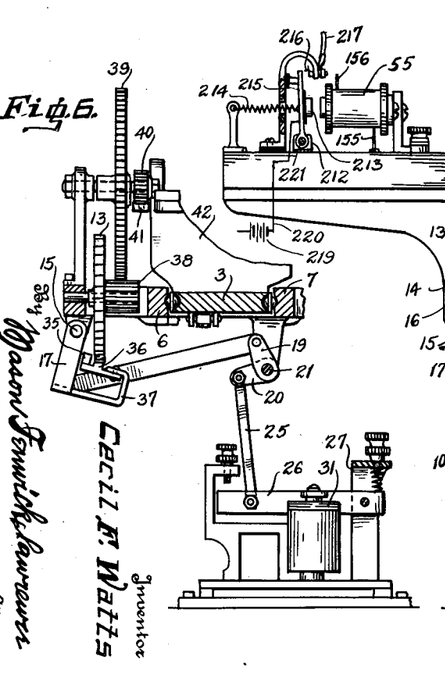
Figure 5 is a rear elevation of the receiver mechanism.

As shown in Figures 4 and 5, the reference numeral 13 designates an escapement wheel, of the type commonly used in typewriter construction, journaled in the rear wall 14 of the frame 1. A bracket 15, depending from a bar 16 at the rear wall 14, has a link 17 pivoted thereto and the free end of this link 17 is pivoted to one end of a connecting rod 18 having its other end connected to the end of an arm 19 of a bellcrank 20 fixed to a shaft 21 having its ends journaled in brackets 22 and 23 depending from the fixed guide member 7 of the framework 1, (see also Figure 5).

The other arm 24 of the bellcrank 20 has its free end connected to the end of a link 25, (see Figure 4) which has its other end pivoted to an armature bar 26, which is pivotally mounted in a support 27 extending upwardly from an insulated base 28 mounted on the base of the frame 1.

The armature bar 26 is pivoted to swing about the fulcrum pin 29 as a lever. A compression spring 30 abuts against one end of the bar 26 to maintain said bar with its armature plate 31 normally out of contact with the upper end of the solenoids 32 and 33. The armature bar 26 corresponds to and is quite similar in operation to, the spacer bar of a typewriter, and is similarly used to control the operation of the escapement wheel 13.

The escapement wheel 13 is controlled directly by means of the teeth 34 and 35 formed on a member 36 which is fixedly secured by a bracket 37 to the pivoted link 17. As will be apparent from Figures 4, 5, and 6, when the link 17 is moved from the position shown in Figure 4 to that shown in Figure 6, it moves the tooth 35 out of contact with one of the teeth on the escapement wheel 13, and the tooth 34 enters the space between the two adjacent teeth and prevents the escapement wheel 13 from rotating through more than one tooth at a time. With the exception of the means for automatically operating this escapement mechanism, this mechanism and its controlling linkage are in common use in present day standard typewriters.

The spacing of the carriage movement as controlled by the escapement mechanism just described is too coarse for efficient use, since it amounts to a movement of about one-tenth of an inch ordinarily. It is preferable to make this movement as short as practicable or possible, and I find a movement of about one-three hundred and twentieth of an inch sufficiently fine for practical purposes.

To reduce the movement of the carriage from the one-tenth of an inch movement effected directly by the ordinary intermittent rotation of the escapement wheel 13, this wheel 13 has a pinion 38 fixed to the center thereof. The pinion 38 meshes with the large gear 39 to effect the desired reduction; and this gear 39 has a pinion 40 fixed to the hub thereof to engage a rack 41, supported from the base 3, of the carriage 2, by means of the standards 42 and 43, (see Figure 5). The reduction gear 39 is journaled in suitable bearings formed in a bracket suitably secured or made integral with the rear wall 10 of the frame 1.

As will be obvious from inspection of the drawings, the escapement gearing just described is necessary to restrain the movement of the carriage 2 along the guides 6 and 7, and to control the distance through which it moves at each intermittent operation of the escapement mechanism. When the carriage reaches the end of its travel it is automatically reversed by means of a pinion 44 fixed to the shaft 45 of a motor 46 automatically operated, as hereinafter described, at the end of each operation of the transmitting mechanism.

A plate 47 for supporting the plate 48, on which the reproduction is to be made, is fixed to the bar 49 of the carriage 2, (see Figure 2) and has its end reinforced by a strip 50 which forms an abutment and guiding strip to receive one end of the plate 48. The plate 47 is provided with a slot 51 for slidably receiving a bolt 52 having a thumb nut 53 thereon for securing a clamping plate 54 in the adjusted position on the plate 47 necessary to secure a plate 48 against the abutment 50 during the reproduction of the transmitted image thereon.

Figure 2:
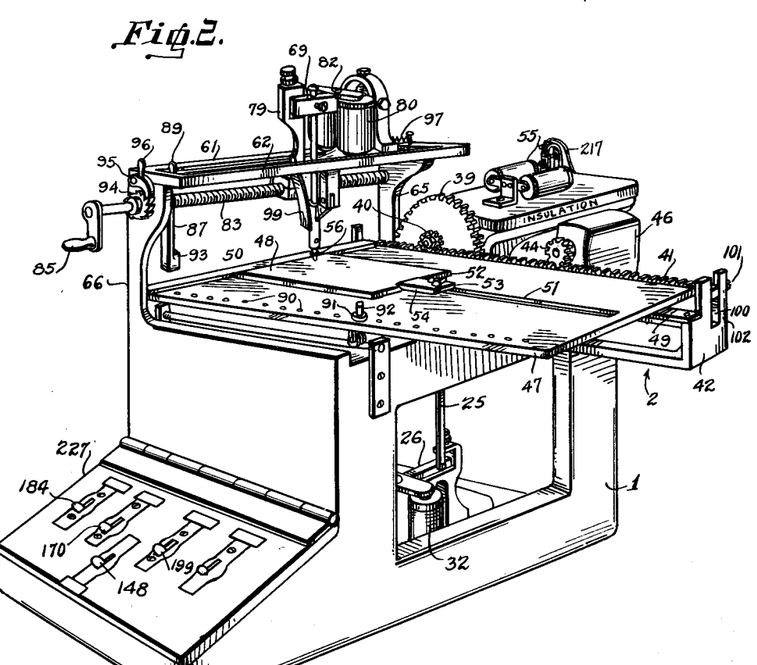
Figure 2 is a perspective view of the receiving member of this system.
Figure 3:
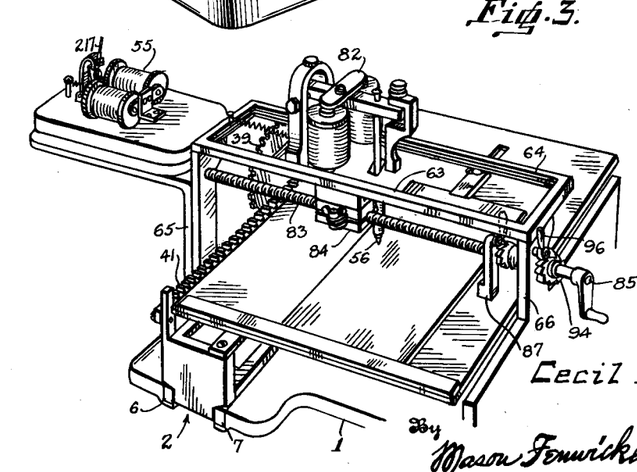
Figure 3 is a fragmentary perspective of the mechanism shown in the upper part of Figure 2.

The intermittent movement of the carriage 2 and the plate 47 supported thereon is controlled from the transmitter by means of a relay 55, shown in Figures 2, 3, and 4, as supported by the rear wall 10 of the frame 1. The structural details of this relay will be described hereinafter in connection with the description of the combined operation of the transmitter and receiver. For the present, it will be sufficient to state that this relay controls the operation of the armature bar 26, which in turn controls the intermittent movement of the receiver carriage 2 and the plate 47 carried thereby.

The engraving tooth 56 is adjustably mounted in a sleeve 57 formed on the end of a rod 58 which is pivoted to the lower end of a bracket 59 depending from a frame 60, which is slidably mounted in the opposed channels 61 and 62 of guide members 63 and 64, forming the sides of a frame rigidly supported by the brackets 65 and 66 extending upwardly from the front and rear of the frame 1.

A spring 67 is connected at one end between the ends of the rod 58 and has its other end connected to the frame 60, in order to hold the upper end of the sleeve 57 raised from the plate 48 and against the stop screw 68, which is screwthreaded into the armature bar 69 and locked in adjusted position on said armature bar by means of the lock nut 70.

The armature bar 69 is secured between its ends to a shaft 71 journaled between the legs 72 and 73 of a standard extending vertically upward from the frame 60. A spring 74 is interposed between the intermediate part 75 of the U-shaped standard to press against the end 76 of the armature bar 69 and maintain its other end 77 normally raised in contact with an adjustable set screw 78 mounted to form a stop in a standard 79 fixed to the end of the frame 60 opposite to the end of the frame carrying the U-shaped standard.

The graver 56 is moved downward into scratching or engraving contact with the plate 48 on the carriage plate 47 whenever the magnets 80 and 81 become energized to attract thereto the armature 82 fixed transversely to the armature bar 69. The energization of the magnets 80 and 81 is controlled through a local source of energy set in operation by the operation of a scanning wheel in the transmitter. This scanning wheel and its operative connection will be described in detail in connection with the diagrammatic illustration of Figure 1.

As will be apparent from the foregoing description, the carriage 2 and the plate 47, along with the plate 48, are moved lengthwise under the graving tooth 56 by the spring controlled escapement mechanism above described. At the end of each predetermined movement of the carriage 2 and the plate 48 under the graver 56 is raised and the carriage returned by the motor 46 to initial position. Before the return of the carriage, however, and at the end of the predetermined movement thereof, the frame 60 carrying the graver 56 is moved toward the front of the instrument by means of the screw 83 journaled between the brackets 65 and 66, and screwthreaded into a nut 84 depending from and fixed to the bottom of the frame 60.

Figure 7:
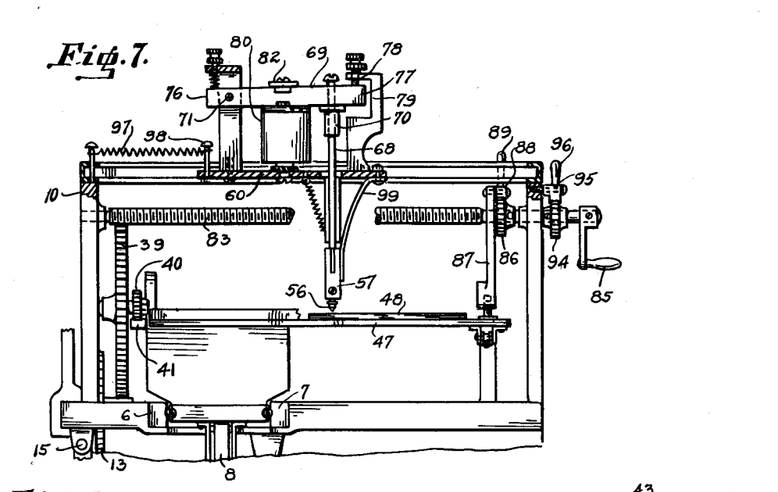
Figure 7 is a side elevation to an enlarged scale of the reproducing mechanism on the receiver.
Figure 8:
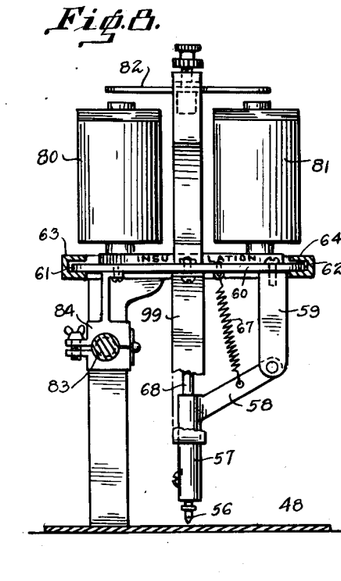
Figure 8 is a front elevation of the mechanism shown in Figure 7, the scale being still further enlarged.
Figure 9:
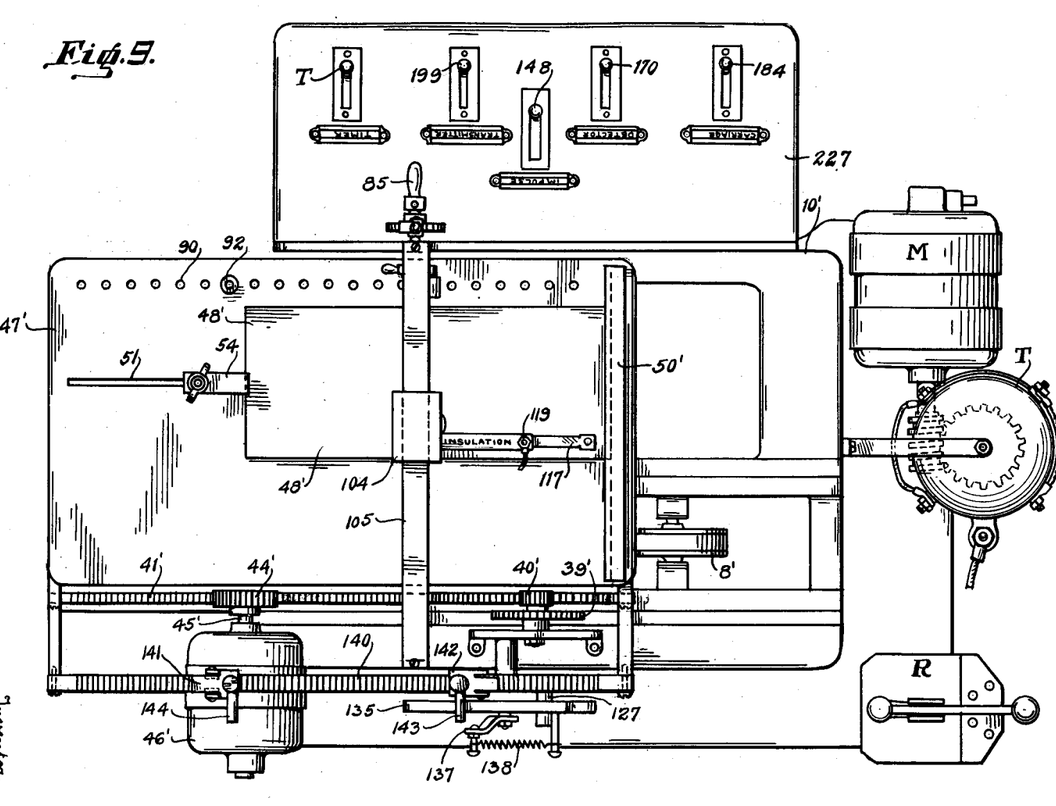
Figure 9 is a plan view of the transmitter forming part of this system.

A handle 85 is fixed to the unthreaded part of the screw 83, which projects outwardly through the standard 66, and may be used to move the frame 60 and the engraving mechanism carried thereby quickly across the carriage 47, in both directions. The operation of adjusting the frame 60 at the end of each longitudinal movement of the plate 48 under the graver 56 is effected by ratchet mechanism shown clearly in Figures 2, 4, and 7. This mechanism comprises a ratchet wheel 86 (see Figure 7) fixed to the screw 83 near the front end thereof; and a lever 87, rotatably mounted on the screw 83 closely adjacent to the ratchet, is provided with a pawl 88, having a handle 89 extending upwardly therefrom and by means of which the pawl 88 can be raised from the ratchet 86 to permit the screw 83 to be rotated in a direction opposite to that permitted by the pawl when in engagement with said ratchet wheel.

The lever 87 is mounted on the screw 83 directly in the path of movement of a series of holes 90 (see Figure 2) formed in the plate 47. Each of these holes is adapted to receive a plug 91 from the upper end of which extends a rod 92, adapted to contact with the adjacent face 93 of the lever 87.

The adjustment of the frame 60 by the screw 83 depends upon the length of the rod 92. Obviously, the shorter the rod 92, the lower will be its point of contact with the face 93 of the lever 87, and the less will be the angular movement of the rod 87. Therefore, the plug 91 will be selected with a predetermined length of rod 92 in order to effect the angular rotation of the lever 87 corresponding to the length of the rod 92. For example, a plug having a rod 92 one inch long would contact with the face 93 near the lower end of the lever 87, and would cause its pawl 88 to rotate the screw 83 through a distance of one tooth on the ratchet wheel 86; while a plug having a rod 92 say one and one-half inches long would contact with the face 93 of lever 87 sufficiently far up from its lower end to cause rotation of the screw 83 through an angular distance equal to two teeth of the ratchet wheel 86.

The lever 87 is weighted at its lower end so that it returns by gravity to vertical position when the carriage 47 is moved backwardly by the motor 46, and in moving to vertical position carries the pawl 86 with it over the teeth of the ratchet wheel 86 ready for the next rotation at the end of the carriage forward movement.

The ratchet wheel 86 and lever 87 are mounted on the inside of the standard 66 in order to be operated by the rod 92 when the plate 47 reaches the end of its travel. In order to prevent backward rotation of the screw 83 when the lever 87 swings with its pawl back to vertical position, the outer projecting part of the screw 83 on the outside of standard 66 has a ratchet wheel 94 fixed thereto to be engaged by a pawl 95 pivotally mounted on the standard 66. This pawl 95 is provided with a handle 96 similar to the handle 89 so that both pawls may be raised simultaneously from their ratchet wheels to permit the screw 83 to be rotated in either direction by the crank handle 85.

As will be described hereinafter, the distance through which the carriage 2 and the plate 47 carried thereby travels from its initial position at the extreme end of the frame 1, is controlled by the transmitter. The stops 91 must therefore be positioned in the hole 90 corresponding to the length of the reproduction in order to give the desired transverse adjustment of the graver 56 for the next lengthwise movement of the carriage 2.

The coil spring 97 having one end fixed to the rear wall 10 of the frame 1 and its other end fixed to a stud 98 on the frame 60, is used to take up lost motion between the screw 83 and the nut 84. A leaf spring 99 secured to the frame 60 engages the side of the sleeve 57 to steady the graver in its cutting operation on the plate 48.

So far as the frame 1 and all the other structure shown in Figure 2, with the exception of the graving mechanism mounted on the frame 60, is concerned, the transmitting mechanism is identical with that shown in Figure 2. The same typewriter release mechanism, the same sliding carriage, and similar means for moving the carriage under the control of the escape mechanism is used in the transmitter. A screw similar to the screw 83 is used on the transmitter to move a tracing wheel a predetermined distance at the end of each sliding movement of the carriage in order to control the movements of the graver 56.

The proportions of the reproduced image may be varied as desired relative to those of the original. In order to effect a change in the length of the reproduced image, the gear or pinion 40 is detachably mounted on the gear 39, so that pinions of different sizes may be substituted for the pinion 40 in order to vary the distance of travel of the carriage 2 at each operation of the escapement mechanism.

Figure 10:
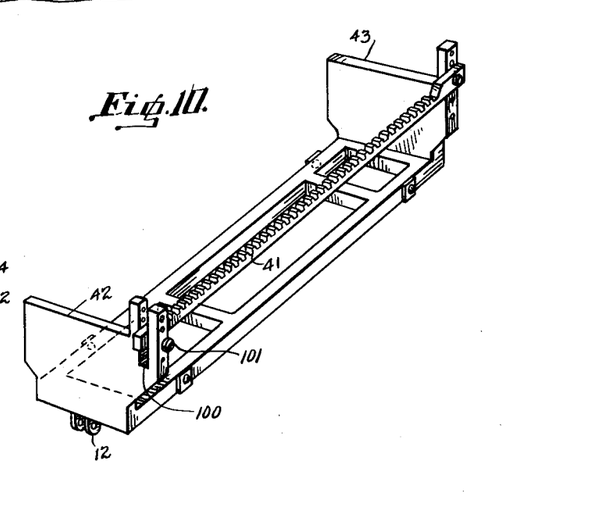
Figure 10 is a perspective view of a plate supporting carriage, forming part of this invention.

In order to accommodate the pinion of different sizes which may be substituted for the pinion 40, it is necessary to make the rack 41 adjustable in the standards 42 and 43. Accordingly, the standards are each provided with a slot 100 (see Figure 10), adapted to receive the rack 41 which is secured in vertically adjusted position in the slots 100 by means of set screws 101. The variations in width of the reproduced image are effected by means of the stop rods 92. For example, the screws 83' of the transmitting instrument which carries the tracing wheel may be rotated through an angular distance of one notch, while the screw 83 of the receiver is turned through an angle of two or more notches, and vice versa.

The transmitter

The parts of the transmitter corresponding to the parts, already described, of the receiver, will not be described specifically herein, but will be designated by the same reference numerals primed. The structural details of the transmitter are illustrated in Figures 9 to 15, inclusive.

In the transmitter (see Figures 9 and 13), the screw 83', of the same pitch as that of the screw 83 in the receiver, is rotatably supported between the standards 102 and 103, and is provided with ratchet mechanism similar to that shown in the receiver and with a handle 85' for the purpose of adjusting the tracer quickly transversely of the plate 47' on which the original image plate 48' is mounted.

The tracer or scanner of the transmitter comprises a block 104 slidably mounted on a cross bar 105 which is detachably secured to the standards 102 and 103. The cross bar 105 is rectangular in cross section and an aperture 106 formed in the block 104 fits slidably over the bar 105 to prevent rotation of the block 104 in its movements transversely of the plate 47'. The block 104 is bifurcated and the furcations 107 and 108 are provided with slots 109 and 110 through which the screw 83' passes freely. In order to move this block across the plate 47', the screw 83' has detachably mounted thereon a split nut 111 adapted to be clamped onto the screw 83' by means of a thumb screw 112 passing through lugs 113 and 114 on the sections of the nut 111 (see Figure 14).

An arm 115 of insulating material is rotatably mounted on the furcation 108 and may be locked in position thereon by means of the set screw 116. At the free end of the arm 115 a leaf spring 117 is detachably connected by means of a bolt 118, provided with a clamping nut 119 to which one of the wires of the electrical system may be connected. The free end of the spring 117 has a carriage 120 fixed thereto; and this carriage has a small scanning or tracing wheel 121 mounted rotatably thereon. The to and fro movement of the scanning wheel 121 is quite similar to that of the graver 56 across the plate 47; and its adjustment by means of the ratchets 86' and 94' is similarly effected.

It is to be noted that the block 104 fits snugly on the rectangular guide bar 105, and that the screw 83' does not contact with any part of this block. The split nut 111 performs the moving operation of the block 104 to and fro across the table 47', and thereby obviates all possibility of any bending or distortion of the screw 83' imparting any kind of irregular movement to the tracing or scanning wheel 121.

Figure 11:
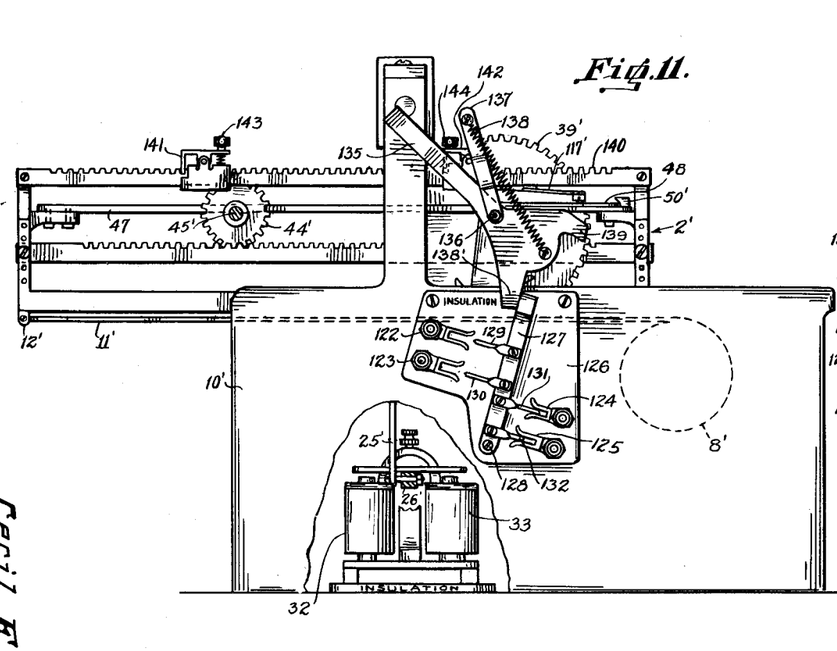
Figure 11 is a rear end elevation of the transmitting instrument illustrating an automatically operable carriage reversing switch.
Figure 12:
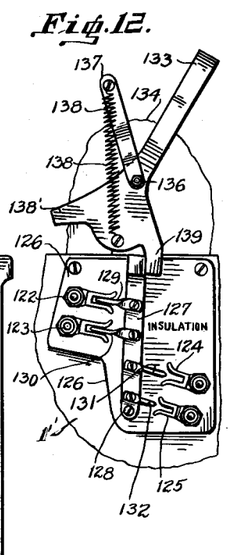
Figure 12 is a fragmentary elevation of the switch shown in Figure 11, but with the parts thereof in different positions.
Figure 13:
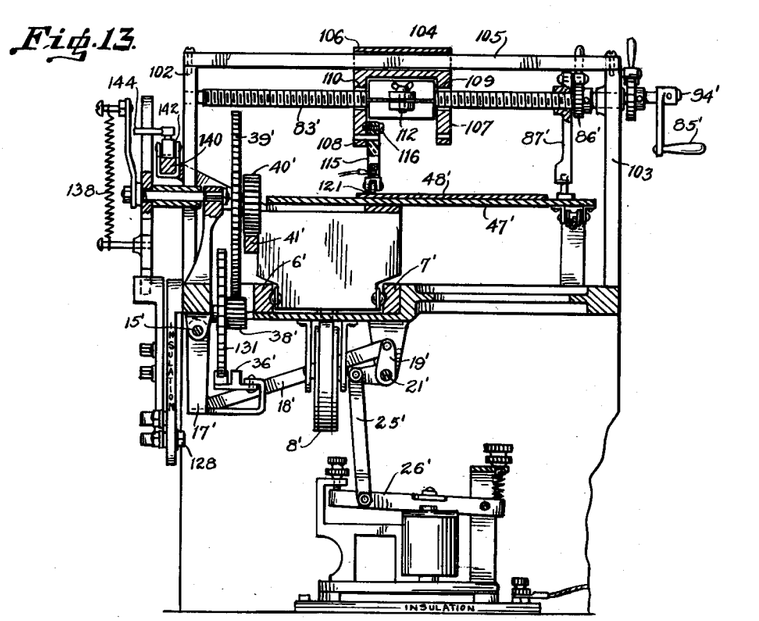
Figure 13 is a fragmentary detail to an enlarged scale, illustrating the operation of the carriage moving mechanism.
Figure 14:
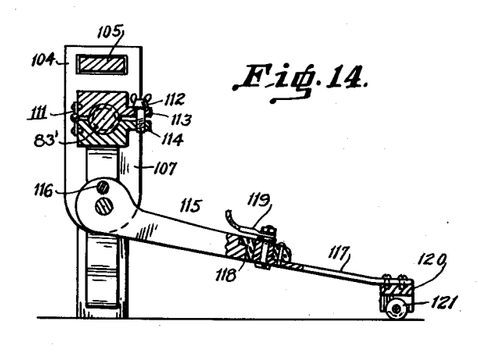
Figure 14 is a fragmentary side elevation of a scanning instrument forming part of the transmitting mechanism.
Figure 15:
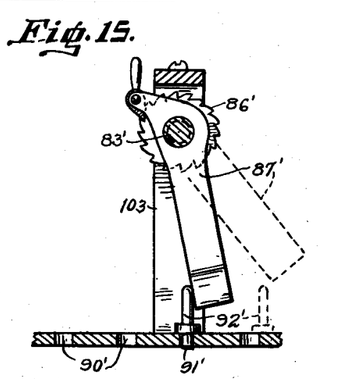
Figure 15 is a side elevation to an enlarged scale of a means operated by the carriage at one end of its movement for feeding the scanning instrument of the transmitter or the reproducing instrument of the receiver transversely of the carriage.

In the transmitter the carriage 2' is automatically reversed at the end of its stroke and is returned to starting position by means of the reversible switch mechanism, shown particularly in Figures 11, 12 and 13. The contact lugs 122, 123, 124 and 125, are mounted on a sheet of insulating material 126 fixed to the back wall 10' of the frame 1' of the transmitter. A switch lever 127 is rotatably mounted at one end thereof by a pivot 128 on the insulated plate 126.

Contact blades 129 and 130 extend from one side of the lever 127 and are adapted to move into electrical contact with the lugs 122 and 123 when the lever 127 is moved to the left of its position shown in Figure 11, and as shown in Figure 12. Contact blades 131 and 132 extend from the opposite side of the lever 127 and engage the contact lugs 124 and 125 when the lever occupies the position shown in Figure 11.

In order to effect the movement of the lever 127 from one position to the other, a reversing lever 133 is pivotally mounted on a bracket 134 fixed to the frame 1'. The pivot 136 has an arm 137 fixed thereto and a tension spring 138 connects the end of this arm to a part of the reversing lever on the other side of the pivot 136.

The construction just described forms snap-over mechanism which precludes the reversing lever 133 from occupying any but one or the other of two predetermined positions, shown in Figures 11 and 12. The lower part of the reversing lever 133 is spread out and shaped to form stop lugs 138' and 139, which engage the upper end of the lever 127 alternately and move the lever from the position shown in Figure 11 to that shown in Figure 12, and vice versa, the contact lugs in each instance forming stops to limit the movements in opposite direction of the reversing lever 133.

In order to operate the reversing lever 135 the transmitter is provided with a notched bar 140 fixed to the carriage 2'. Spring actuated stops 141 and 142 are adjustably mounted on the bar 140 and may be locked in any desired position thereon in a manner similar to the adjustment of slidable stops on typewriter mechanism. Lugs 143 and 144 project laterally from the stops 141 and 142, respectively, on opposite sides of the upper arm of the reversing lever 135. The lug 144 is positioned against the arm 135 at the start of the operation and with the lever 127 in the position shown in Figure 11; and the lug 143 is located by means of the stop 141 on the bar 140 in position to engage the lever 135 to move it into carriage reversing position as shown in Figure 12.

The motors 46 and 46' of the receiver and transmitter, respectively, and the motor M of the transmitter are the only parts of the two instruments which are operated from an external source of energy. These motors may be either direct or alternating depending upon the nature of the power main; but the other elements of the transmitter and receiver which are operated by electromagnets must be operated by direct current; and batteries are provided to operate these elements for this reason.

This system of transmission is controlled by an interrupted direct current; and the interruption is effected by a timer T (see Figure 9) which is operated by a motor M connected through a rheostat R and a hand controlled switch S to one of the power mains P, the other power main P' being connected to the terminal of the motor M opposite to that which is connected to the rheostat.

Referring now to the wiring diagram in Figure 1, the operation of the parts will be described in detail and the several elements diagrammatically shown in Figure 1 will be given the same numbers as have been given to the corresponding parts in the other sheets of the drawings.

The wiring diagram is divided into two parts by the central broken line, the parts shown to the left of said line indicating the corresponding parts of the transmitter, while those to the right of the line indicate the several parts of the receiver. In order to effect the intermittent movement of the carriage 2' under control of the coil spring 8', there is provided a battery 145, the current of which is interrupted by the timer T which is cut in on the return line 146 of the battery circuit, as shown in Figure 1.

A line 147 leads from the positive contact of the battery 145 to a manually controlled switch 148 adapted to be moved into and out of contact with a contact point 149 at the end of a line 150, leading through a resistance 151 to the relay 55' adapted to attract an armature 152 to make contact with a contact point 153 at the end of a wire 154 tapped off from the wire 147 at its connection with the pivot end of the switch 148. The wiring of the relay 55' is connected by the wire 155 to the relay 55 in the receiver.

A wire 156 connects the other end of the relay 55 to a contact 157 adapted to make electrical contact with a manually controlled double-throw switch 158, which is also adapted to contact with a terminal 159 at the end of the short circuiting wire 160, which is tapped off the wire 155 between the relays 55 and 55'. The pivot end of the switch 158 is connected to a wire 161 which leads to the contact blade 129 on the reversible lever arm 127, and through this contact blade and a contact lug 122 to the return wire 146 and timer T to the minus side of the battery 145.

It will be evident that when the switch 148 is closed, both relays 55' and 55, in the transmitter and receiver, respectively, will become energized when the manually controlled switch 158 is thrown to the contact terminal 157. The short circuit switch line 160 is arranged in the receiver in order to permit the relay 55 of that particular receiver to be cut out of operation while permitting the transmitter to be operated and to be operatively connected to receivers in other locations. Of course, it must be understood that a single transmitter is used to operate any desired number of receivers which may be connected up by suitable transmission lines to the transmitter. Each of the receivers will be provided with that short circuit wire 160 in order that it may be cut out of operation without interfering in any way with the operation of any or all of the other receivers.

The relay 55' controls the operation of the spacer bar 26' which forms the armature for the electromagnets 32' and 33'. The circuit for these electromagnets comprises, when the bar 152 is in contact with the terminal 153, the wire 147, 154, contact 153, bar 152, wire 162, the wiring of the magnets 32' and 33' and wire 163 to the return wire 146. When the magnets 32 and 33' are energized they attract the armature bar 26' against the resistance of the spring 30' to operate the escapement wheel 13' and permit the carriage 2' to be pulled along intermittently by the coil spring 8' and the cable connecting it to the carriage 2'. This structure is represented in detail particularly in Figure 4 of the drawings, illustrating the spring controlled escapement movement of the carriage 2.

The intermittent movement of the carriage 2' under control of the relay 55' and the electromagnets 32' and 33' can only occur during the forward movement of the carriage 2' when the contact lever arm 127 is in circuit closing contact with the terminals 122 on the wire 146. During this time the scanning operation of the tracer wheel 121 over the image plate 48' is effected. The current for the scanning operation is derived from the battery 164.

The circuit from the scanning wheel 121 through the battery 164 is effected by the wire 165 electrically connected to the leaf spring 117 of the scanner, and this wire 165 is electrically connected to the contact plate 130 of the contact lever arm 127, and through the contact lug 123 to the wire 166 which leads to the minus side of the battery 164.

The plus side of the battery 164 is connected by a wire 167 to a relay magnet 168' controlling the operation of the graver 56 in the receiver. The wiring of the relay 168' is connected by a wire 169 to a manually controlled switch 170 to a wire 171 having a roller 172 thereon in electrical contact with the conducting plate 47' carried by the carriage 2'. This completes the circuit from the battery 164 through the tracer wheel 121, and controls the operation of the graver 56 in the receiver by the operation and in synchronism with the operation of the said tracer wheel.

The relay magnet 168' of the transmitter controls, through relay R, the movements of the armature bar 173 toward and from the terminal 174 at the end of a wire 175 leading from the minus side of the battery 176. A wire 177 leads from the plus side of the battery 176 through a manually controlled switch 178 adapted to make contact with the terminal 179 at the end of the wire 180.

The wire 180 is connected to the electromagnets 80 and 81 and continues in series through the said electromagnets to connect with the wire 181 leading to the pivotal connection 182 of the armature bar 173, thereby completing the circuit through the battery 176 when the bar 173 makes electrical contact with the contact terminal 174.

Figure 1:
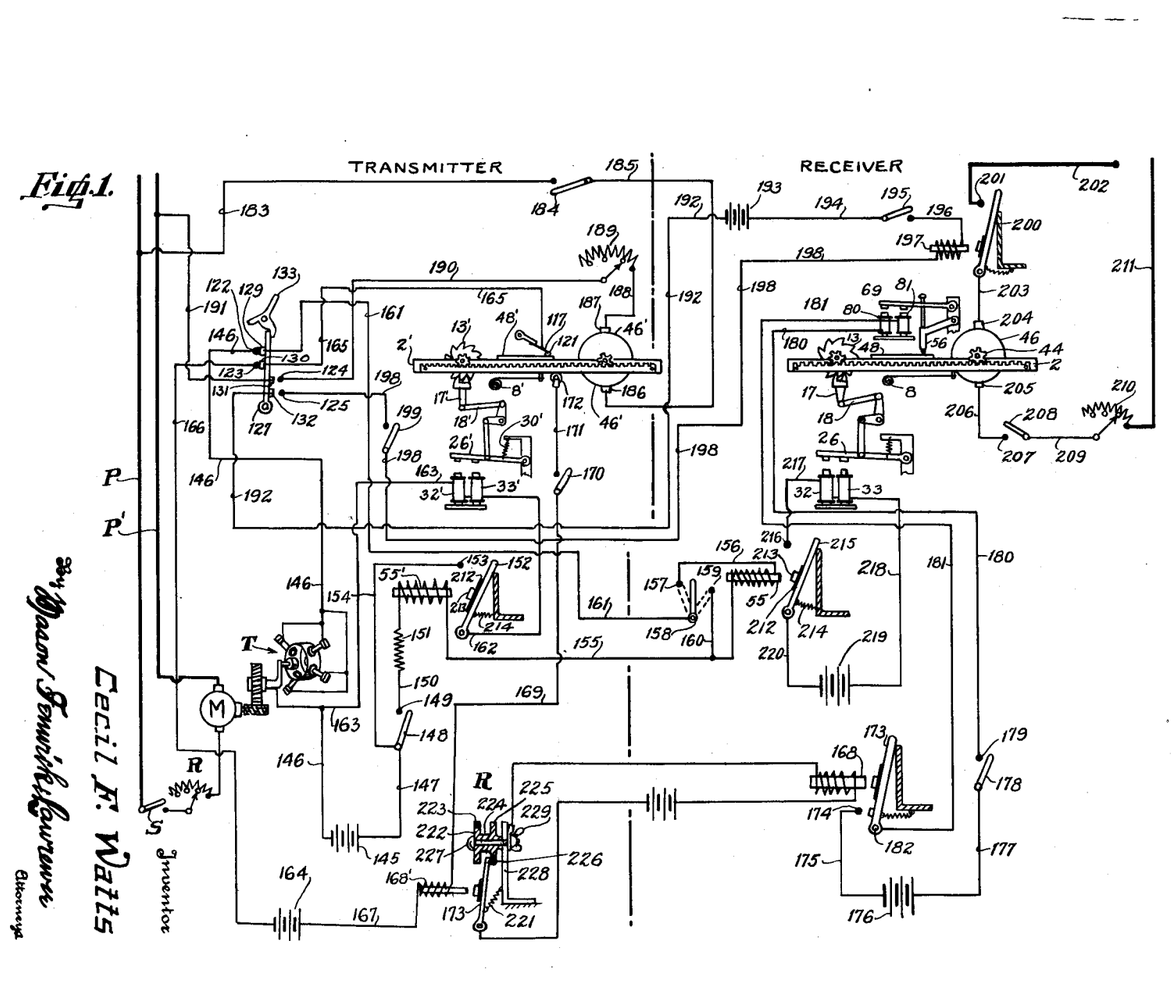
Figure 1 is a diagrammatic layout of a transmitter and receiver constituting an operative unit of a system of transmission involving this invention.

As will be obvious from the foregoing description, and from inspection of Figure 1, the operation of the tracer 121 also controls the operation of the graver 56, since the energization of the magnets 80 and 81 causes the bar 69 to reciprocate and move the graver 56 into cutting contact with the surface of the reproducing plate 48.

The reversal of the carriage 2 of the receiver by the motor 46 is controlled by the automatic reversing switch 127 in the transmitter, and the motors 46' are operated from power mains in each location. It must be understood, however, that these motors cannot be operated until each of the carriages 2 and 2' have reached the end of the travel and have to be reversed into action.

The circuit for operating the motor 46' starts with a wire 183 connected to the power main P, and extends through a manually controlled switch 184 and wire 185 to the terminal 186 of the motor 46'. The other terminal 187 of the motor 46' is connected by a wire 188 to a rheostat 189; and from the rheostat by a wire 190 to a terminal or lug 124 on the insulated panel 186 (see also Figures 11 and 12) adapted to receive the contact blade 131 on the reversible lever arm 127. A wire 191 connects the contact blade 131 to the other power main P'. The contact lug 125 is adapted to make contact with the contact blade 132 which is connected by a wire 192 to the battery 193 in the receiver.

The other side of the battery 193 in the receiver is connected by a wire 194 and a manually controlled switch 195 and wire 196 to a relay 197, the other end of which is connected by a wire 198 to the terminal 125 at the reversing contact lever 127, a manually controlled switch 199 being interposed in the line 198 of the transmitter, in order that the operation of the reversing motor may be independently controlled in both transmitter and receiver.

When the automatic reversing mechanism shown in Figure 11 is thrown to close contact between the lugs 124 and 125 and the blades 131 and 132, it causes the relay 197 in the receiver to be energized and this energization attracts the relay armature bar 200 to make contact with the terminal 201 of the power main 202. The pivot end of the bar 200 is connected by a wire 203 to the terminal 204 of the motor 46; and the other terminal 205 of the motor 46 is connected by a wire 206 to the terminal contact 207 of a manually controlled switch 208. The pivot end of the switch 208 is connected by a wire 209 to a rheostat 210; and this rheostat is connected in turn to the other power main 211.

While I have shown the reversing motor of the receiver as controlled from the transmitter, it must be understood that an automatic reversing switch can be added to the receiver in order to eliminate the battery 193 and everything else included in its circuit. The circuits shown in Figure 1, however, insure absolute synchronism in the operation of the carriage reversing motor 46 and 46' and in all the other elements of both transmitter and receiver which are controlled from the transmitter itself.

It must also be understood that the receivers and transmitters of this system may be made identical in every respect so that any one of them may be operated as a transmitter for any or all of the others operating as receivers.

The several relays shown in Figure 1 of the drawings include a contact bar similar to the bar 152 of the relay 55', and each of these bars is provided with a strip of insulation 212 to prevent current from the relay passing through to the bar 152. A plate 213 of conducting material is secured to the insulated strip 212 in order that energization of the relay magnet 55 will attract the bar 152 against the tension of the spring 214 to make contact with the terminal 153. The energization of the relay 55 in the receiver draws the armature bar 215 into circuit closing contact with the terminal 216 at the end of the wire 217 leading to the electromagnets 32 and 33 of the spacer mechanism in the receiver. A wire 218 connects the other side of the magnets 32 and 33 to the plus side of the battery 219 which has its minus side connected by wire 220 to the pivoted end of the relay bar 215.

Energization of the magnets 32 and 33 attracts the spacer armature bar 26 and causes the intermittent operation of the escapement mechanism 13 to permit the intermittent movement of the carriage 2 under tension of the coil spring 8.

From the foregoing disclosure, it will be apparent that the operation of all the parts of the receiver is dependent upon the operation of the corresponding parts of the transmitter and cannot possibly operate except in synchronism with the transmitter parts. The interrupted current is obviously necessary in order to effect the spacer operation of the carriages in both transmitters and receivers, and the timer control of the periods of interruption insures absolute synchronism in the application of current in the several instruments to effect the movement of the parts thereof.

As previously stated, this invention is adapted to transmit either a positive or a negative of the image to be transmitted from the transmitting plate 48'. This reversal of transmission is effected by the peculiarly constructed relay which may be arranged either in the circuit of the scanner 120 or in that of the graver 56 or in both circuits. It will be obvious that in transmitting a positive of the image on the plate 48', the electric transmission will be effected when the tracer wheel 121 passes over a bright spot on the image and will cause the graver 56 of the receiver to scratch off a portion of the metal on the reproducing plate 48 to correspond with the bright spot on the original image.

In order to effect the reversal in the transmission of the image, all that is required is to effect transmission of the electrical impulses from the transmitters to the receivers during the period when the tracer wheel 121 is passing over an insulated dark spot on the image plate 48'. In other words, the passage of the tracer wheels 121 over a dark spot on the image to be transmitted will cause the graver 56 to be depressed and form a bright spot on the reproducing plate.

In order to effect this reversal of image, or to secure similarity between the image and reproduction thereof, I may insert an adjustable relay in circuit of either the tracer wheel 121 or the graver 56. In Figure 1 of the drawings I have shown this relay designated generally by the reference character R, as controlled by the operation of the tracer wheel 121.

This relay R includes electromagnet 168' arranged when energized to attract the armature bar 173, against the tension of a spring 221, into contact with the disk 222 which is provided, near its periphery, with an insulating segment 223. The disk 222 is electrically connected by a hub 224 to a similar disk 225, provided also with segment of insulation 226, which is offset angularly from the segment 223.

A bolt 227 passes centrally through the disks 222 and 225 and their common hub 224 and through a fixed standard 228. A thumb nut 229 threaded onto the bolt 227, serves to clamp the disks in any desired position of angular adjustment on the standard 228.

It will be obvious from inspection of Figure 1, that (with the disks 222 and 225 in the position shown) when the magnet 168' is energized the bar 173 will be drawn into contact with the conducting part of disk 222 to energize the receiver magnet 168, and thereby operate the graver 56 simultaneously with the passage of the tracer wheel 121 over the bright spots on the image plate 48'. When magnet 168' is deenergized, the spring 221 draws the bar 173 against the insulating segment 226 to break circuit through receiver magnet 168.

It will be obvious that if the disks 222 and 225 be rotated through an angle of 180 degrees, the insulating segment 223 will contact with the end of bar 173 when the magnet 168' is energized, and with the conducting part of disk 225 when this magnet is deenergized. This means that the graver 56 would be thrown into operation only when the tracer wheel 121 was passing over an insulated or dark spot on the image 48'. In other words, the reproduction would be the reverse or negative of the image on plate 48'.

The relay 55 is shown merely on the outside of the frame 1, for convenience of description and illustration, but it is intended to be placed with all the other mechanism within the frame 1 to make a compact unit.

The lower part of the frame 1 is provided with a hinged door 230 on which are mounted the various manually controlled switches shown in Fig. 1. This construction makes it very easy to assemble all the parts within the frame 1 and to connect them up to the various switches very conveniently.

While I have shown and described a single receiver operated by a transmitter, it must be understood that any number of receivers may be operated by the same transmitter. It must also be understood that where transmitters and receivers are made identical, so that a scanning wheel may be substituted for the graver in any particular instrument, any one instrument of the system may be used as a transmitter for any or all of the other instruments of the system.

It must also be understood that the instruments of this system may be operated by radio instead of by the wiring connecting one instrument to the other or others. Since the receiving instrument is intended to cut into a metallic plate, it is obvious that the reproduction of the original image may be used at once as a plate from which prints may be taken directly. Where the cutting in the reproducer plate is intended to have depth enough to adapt it immediately for printing, it is preferable that a diamond be used as a graver in the receiver.

It it believed that the operation of the invention will be obvious from the foregoing disclosure, since the operation of the various units comprising the whole system has been given in detail in connection with a description of said units.

What I claim is:

1. In a telegravure system, a transmitter including a member having an image transmitting surface, a receiver including a member having an image receiving surface, means for intermittently moving said members in synchronism through predetermined distances in one direction, means for continuously moving said surfaces in the opposite direction at the end of their intermittent movements through said predetermined distances, a tracer in yielding contact with said transmitting surface, reproducing means adapted to operate on said receiving surface, and means operable only during the intermittent movements of said surfaces to control the operation of said reproducing means by contact of said tracer with said transmitting surface.

2. In a telegravure system, a transmitter including a member having a plane image transmitting surface, a receiver including a member having a plane image receiving surface, means for intermittently and synchronously moving said members through predetermined distances rectilinearly in one direction, a tracer in contact with the image transmitting surface, reproducing means adapted to operate on said receiving surface, and means operable only during the intermittent movement of said members to control the operation of said reproducing means by contact of said tracer with said transmitting surface.

3. In a telegravure system, a transmitter including a member having an image transmitting surface, a receiver including a member having an image receiving surface, a source of direct current, means for periodically making and breaking the circuit including the transmitter and receiver and said source, means operated by the make and break of said circuit for moving said members intermittently in one direction, a tracer in continuous electrical contact with said transmitting surface, reproducing means adapted to operate on said receiving surface, and an independent circuit for controlling the operation of said reproducing means by the contact of said tracer with the image transmitting surface.

4. In a telegravure system, a transmitter and a receiver in circuit with each other, said transmitter including a member having a transmitting surface with the image thereon formed by conducting and non-conducting spots, a tracer in continuous yielding contact with the said transmitting surface, a receiver including a member having an image receiving surface, a reproducing device adapted to operate on said receiving surface, means for intermittently and synchronously moving said members in one direction through predetermined distances, and means connecting said tracer and reproducing device to cause operation of said device during the intermittent movement of said surfaces.

5. In a telegravure system, a transmitter and a receiver in circuit with each other, said transmitter including a member having a transmitting surface with the image thereon formed by conducting and non-conducting spots, a tracer in continuous yielding contact with the said transmitting surface, a receiver including a member having an image receiving surface, a reproducing device adapted to operate on said receiving surface, means for intermittently and synchronously moving said members in one direction through predetermined distances, means for continuously moving said surfaces in the opposite direction at the end of their intermittent movements through said distances, and means connecting said tracer and reproducing device to cause operation of said device only during the intermittent movement of said surfaces.

6. In a telegravure system, a transmitter and a receiver, each comprising a support, a carriage slidable rectilinearly on said support and adapted to have a plane image transmitting or receiving plate secured thereto, a spring for moving said carriage in one direction on said support, escapement mechanism to control the movements of said carriage under the tension of said spring, and automatically operable means for moving said carriage in the opposite direction.

7. In a telegravure system, a transmitter and a receiver each comprising a support, a carriage slidable rectilinearly on said support and adapted to have a plane image transmitting or receiving plate secured thereto, escapement mechanism for moving said carriage intermittently in one direction on said support, means for automatically operating said escapement mechanism, and means for automatically moving said carriage in the opposite direction after predetermined movements of said carriage in intermittent movement.

8. In a telegravure system, a transmitter and a receiver each comprising a support, a carriage slidable rectilinearly on said support and adapted to have a plane image transmitting or receiving plate secured thereto, escapement mechanism for moving said carriage intermittently in one direction in said support, a motor for moving said carriage continuously in the opposite direction on said support, means for automatically operating said escapement mechanism, and means operable by the intermittent movement of said carriage through a predetermined distance to throw the escapement mechanism out of operation and to operate said motor.

9. A telegravure system including a transmitter and a receiver, means for transmitting an image from the transmitter to the receiver, and adjustable means for varying the proportions of the transmitted image in two dimensions relative to the original and in either of said two dimensions to the exclusion of the other.

10. A telegravure system including a transmitter and a receiver, each of which comprises a support and a carriage slidable rectilinearly thereon, means for intermittently moving said carriages in synchronism with each other in one direction, and means for varying the distance which one carriage moves relative to the other during each period of their intermittent movement.

11. A telegravure system including a transmitting instrument and a receiving instrument, each of which comprises a support and a carriage slidable rectilinearly thereon, a tool movably transversely on said support in a direction perpendicular to the direction of movement of said carriage, and means for varying the distance through which the tool of one of said instruments moves during the transverse movement of the tool of the other instrument.

12. A telegravure system including a transmitter and a receiver, each of which comprises a support and a carriage slidable rectilinearly thereon, means for moving said carriage intermittently through a predetermined distance, a tool transversely adjustable on said support in a direction perpendicular to the direction of movement of said carriage, and means automatically operable by the movement of said carriage through said predetermined distance for adjusting said tool transversely through a predetermined distance.

13. A telegravure system including a transmitter and a receiver, each of which comprises a support and a carriage slidable rectilinearly thereon, a tool transversely adjustable on said support in a direction perpendicular to the direction of movement of said carriage, means automatically operable by the movement of said carriage through said predetermined distance to effect a predetermined adjustment of said tool, and means for varying the distance through which one tool moves relative to that through which the other moves during their simultaneous adjustment.

14. A telegravure system including a transmitter and a receiver, each of which comprises a support and a carriage slidable rectilinearly thereon, a tool mounted for adjustment transversely of said carriage, means for varying the distance through which one tool moves relative to the other, and means for varying the distances through which one carriage moves relative to the other carriage.

15. A telegravure system including a transmitting and a receiving instrument, each of which comprises a support and a plane faced carriage slidable rectilinearly thereon, a tool movable transversely of said carriage, and means for adjusting the tool of each instrument across said carriage at the end of a predetermined movement of the carriage of each instrument in one direction on its support.

In testimony whereof I affix my signature.

CECIL F. WATTS.